United States Patent [19]

Case et al.

[11] 3,912,625

[45] Oct. 14, 1975

[54] METHOD FOR REMOVING AND DECOLORIZING AQUEOUS WASTE EFFLUENTS CONTAINING DISSOLVED OR DISPERSED ORGANIC MATTER

[75] Inventors: Forrest N. Case, Oak Ridge; Eugene E. Ketchen, Kingston, both of Tenn.

[73] Assignee: The United States of America as represented by the United States Energy Research and Development Administration, Washington, D.C.

[22] Filed: Nov. 5, 1973

[21] Appl. No.: 412,850

Related U.S. Application Data

[63] Continuation of Ser. No. 240,805, April 4, 1972, abandoned.

[52] U.S. Cl. ...................... 210/30; 210/40; 210/63; 252/411 R
[51] Int. Cl.² .......................................... B01D 15/06
[58] Field of Search ............. 210/24, 29, 32, 39, 40, 210/30, 63; 252/410, 411 R

[56] References Cited
UNITED STATES PATENTS

| | | | |
|---|---|---|---|
| 2,284,593 | 5/1942 | Seidel | 210/40 |
| 2,445,323 | 7/1948 | Galatioto | 210/40 |
| 2,587,425 | 2/1952 | Adams et al. | 252/411 R |
| 2,905,608 | 9/1959 | Noddings et al. | 252/411 R |
| 3,846,296 | 11/1974 | Hay | 210/27 |

OTHER PUBLICATIONS

"Bleaching of Drying Oils by Ionizing Radiation", J. B. Lavigne, Journal of the American Oil Chemists' Society, Vol. 35, Mar. 1958, pp. 117–120.
Chemical Abstracts, Vol. 55, Abstract No. 11, 691 d, e.

*Primary Examiner*—Samih N. Zaharna
*Assistant Examiner*—Ivars Cintins
*Attorney, Agent, or Firm*—John A. Horan; David S. Zachry

[57] ABSTRACT

A method is provided for treating organic waste material dissolved or dispersed in an aqueous effluent which comprises contacting the effluent with an inert particulate carbonaceous sorbent at an oxygen pressure up to 2000 psi, irradiating the resultant mixture with high energy radiation until a decolorized liquid is produced, and then separating the decolorized liquid.

3 Claims, No Drawings

METHOD FOR REMOVING AND DECOLORIZING AQUEOUS WASTE EFFLUENTS CONTAINING DISSOLVED OR DISPERSED ORGANIC MATTER

This is a continuation of application Ser. No. 240,805, filed Apr. 4, 1972, now abandoned.

BACKGROUND OF THE INVENTION

The invention described herein was made in the course of, or under, a contract with the U.S. Atomic Energy Commission.

The present invention relates generally to an improved method of pollution control. More particularly, it relates to a method of concurrently conducting sorption and regeneration of a carbonaceous sorbent.

Carbonaceous materials such as lignin charcoal, bone charcoal, coal or coke particles, activated carbon, and the like, are used for many purposes in many chemical processes as sorbents to obtain clarification, purification, or refinement of a desired product. In time, these materials become saturated or clogged with impurities and are then termed to be in "spent" form so that they no longer adequately perform their sorptive function.

Methods for regenerating such spent sorbents exist in the prior art. They invariably require that the spent sorbent be disengaged from the previously ongoing sorption process to be regenerated generally by a high temperature oxidation process. Such oxidation invariably destroys an appreciable percentage of the sorbent by conversion to CO and/or $CO_2$ and produces a regenerated or rejuvenated product with reduced sorptive capacity.

SUMMARY OF THE INVENTION

The present invention differs from the prior art in that it provides a method in which the processes of sorption and regeneration take place concurrently. It is accordingly a general object of this invention to provide a method of removing chromophoric organic matter dissolved or dispersed in an aqueous waste effluent. A specific object is to accomplish the general object in a method which removes chromophoric organic matter from an aqueous waste effluent by sorption on a carbonaceous sorbent while concurrently regenerating the sorbent. A further object of this invention is to convert colored organic compounds into colorless or less colored form.

The objects of this invention are realized by a process comprising mixing an aqueous waste effluent containing dissolved or dispersed chromophoric organic matter with a carbonaceous sorbent of the character described while irradiating the effluent-sorbent mixture with high energy radiation. In the context of this invention, high energy radiation means that form of radiation which has the capacity to destroy or convert organic compounds containing chromophoric groups into colorless or less-colored form. In the following examples which we cite to illustrate the invention, we use cobalt-60, a gamma-emitting isotope, as an effective source of high energy radiation. Other functionally equivalent radiation sources may be used to practice this invention, such as $Cs^{137}$, $Ce^{134}$, $Ir^{192}$, and $Eu^{152,154}$.

The invention is illustrated in the following examples.

EXAMPLE I

A 30-mesh granular activated charcoal derived from coconut shell was saturated with an aqueous solution of an organic dye. Saturation was defined as the point where more than 95% of the color of the dye solution was sorbed on the charcoal. Decolorization was determined by the reduction in light absorbance at 350, 450, and 550 millimicrons, the principal absorption peaks for this dye. Absorption values were summed to yield a "color factor" which was used as a basis for comparing results, where Color factor $= (X + Y + Z)D$, where $X$, $Y$ and $Z =$ the sum of the optical wavelengths at three selected wavelengths, and $D =$ a dilution factor corresponding to the dilution of samples with distilled water to bring the sample into the color range of the measuring spectrophotometer.

An additional volume of dye solution was then mixed with the saturated charcoal and irradiated with a cobalt-60 source. After irradiation, the aqueous phase was separated from the charcoal and tested for absorption at the stated wavelengths. Irradiations were conducted in air at ambient pressure and temperature, i.e., 25°C. Table I below shows the results of the experiment.

TABLE I

|  | Dye Solution | Dye Solution Irradiated without Charcoal | Dye Solution + Saturated Charcoal Irradiated |
|---|---|---|---|
| Radiation dose, Rads |  | $10^6$ | $10^6$ |
| Color factor | 1.325 | 0.685 | 0.189 |
| % Color removed* |  | 50 | 86 |
| Radiation exposure time, min. |  | 72 | 72 |

*% Color reduction is $(A - B/A) \times 100$, where A = color units of untreated sample and B = color units of treated sample.

From the results shown in Table I, it is concluded that the presence of the spent charcoal increased the color removal by 36% over that obtained by irradiation alone. The effect observed is believed to be due to the reactivation of the charcoal by gamma radiation. The mechanism apparently involves destruction of organic material held on sorptive sites on the spent charcoal so that the observed increase in color removal is due to the availability of new or regenerated sorptive sites.

EXAMPLE II

Ten grams of activated coconut charcoal (30 mesh granular) saturated with a dye solution was repeatedly irradiated in contact with successive 100-cc volumes of dye solution. The results are summarized in Table II.

TABLE II

| Run | Sample Description | Dose, Rads | Radiation Exposure Time, min | Color* Factor | pH | %* Color Removal |
|---|---|---|---|---|---|---|
| 1 | Saturated charcoal | $5 \times 10^5$ | 36 | 0.44 | 8.0 | 83 |
| 2 | Charcoal used with Run 1 | $1 \times 10^6$ | 72 | 0.488 | 8.4 | 81 |
| 3 | Charcoal used with Run 2 | $1 \times 10^6$ | 72 | 0.454 | 7.9 | 83 |

TABLE II-continued

| Run | Sample Description | Dose, Rads | Radiation Exposure Time, min | Color* Factor | pH | %* Color Removal |
|-----|--------------------|------------|------------------------------|---------------|-----|------------------|
| 4 | Charcoal used with Run 3 | $2 \times 10^6$ | 149 | 0.204 | 8.3 | 92 |

*Based on color factor of 2.615 of unirradiated dye solution.

Based on the constant percent of color removal of Runs 1–3, it is clear that irradiation was generating or regenerating sorptive sites in the charcoal which was initially already saturated with dye. The heightened increase in color removal in run 4 indicates that the degree of color removal is a function of dosage or time of exposure or both.

EXAMPLE III

A preferred mode of operating this invention is with a high pressure of oxygen applied to the feed. We have found that a high oxygen pressure serves the equivalent purpose of radiation to a limited extent or, stated alternatively, a high oxygen pressure will, at a given dosage, heighten the regenerative effect of radiation on charcoal. Generally, a minimum oxygen pressure of at least 50 psi is required in order to realize a measurable beneficial effect.

In this example, the effect of oxygen pressure on the reactivation of charcoal by gamma radiation was determined.

Ten grams of charcoal saturated with dye solution as described above was irradiated in 100 cc of distilled water under a pressure of 1000 psi oxygen for 72 minutes to a gamma dosage of $10^6$ R. This treatment was made to determine whether the saturated charcoal would be reactivated relative to the adsorption of dye from a standard dye solution.

The results are shown in Table III.

TABLE III

|  | Saturated Charcoal before Irradiation under 1000 psi $O_2$ Exposed to 100 cc Std. Dye Solution | Saturated Charcoal after Irradiation under 1000 psi $O_2$ with 100-cc Units of $H_2O$ Exposed to Std. Dye Solution |
|---|---|---|
| Weight of charcoal, g. | 10 | 10 |
| Radiation exposure time, min. | None | 72 |
| Radiation dose, Rads | None | $10^6$ |
| Color reduction of dye solution after mixture with charcoal, % | 5 | 91 |

The results show that reactivation of the charcoal had occurred. Stated in alternate terms, restoration of the capacity of the charcoal virtually equal to the capacity of the unirradiated charcoal as received from the manufacturer was demonstrated.

EXAMPLE IV

Additional tests were made to determine the effect of gamma irradiation with oxygen present on the reactivation of dye-saturated charcoal. In these tests, 10 g of charcoal saturated with an organic dye solution was irradiated in 100 cc of distilled water under a pressure of 1000 psi oxygen for 72 min. to a total gamma dose of $10^6$ R. The charcoal was then exposed for 16 hr. to a new batch of 100-cc standard dye solution to determine whether or not its sorptive capacity for dye from the standard dye solution had been restored. The results of this test are shown in Table IV.

TABLE IV

|  | Saturated Charcoal before Irradiation under 1000 psi $O_2$ Exposed to 100 cc Std. Dye Solution | Saturated Charcoal after Irradiation under 1000 psi $O_2$ with 100 cc Distilled $H_2O$ (then Exposed to 100 cc Dye Solution) |
|---|---|---|
| Weight of charcoal, g. | 10 | 10 |
| Radiation exposure time, min. | None | 72 |
| Radiation dose, R | None | $10^6$ |
| Color reduction of aqueous dye solution after 16-hr. shaking with charcoal, % | 5 | 91 |

The results indicate that either the capacity of the charcoal had been restored or that new sorptive sites had been generated on the charcoal to allow it to reduce the effluent dye solution by 91%.

EXAMPLE V

An aqueous solution of a benzyl cyanine dye was pumped through a column of charcoal under three conditions: (1) at atmospheric pressure with no irradiation, (2) at atmospheric pressure with the charcoal exposed to $10^7$ R from a cobalt-60 source, and, finally, (3) with the solution under an oxygen pressure of 1500 psi and the charcoal exposed to $10^7$ R as in (2).

The results are summarized in Table V below.

TABLE V

| Analytical Data for Radiolytic Oxidation of Benzyl Cyanine 6B Dye | | | |
|---|---|---|---|
|  | No Exposure Atmospheric | $10^7$ R Field Atmospheric | $10^7$ R Field 1500 psi $O_2$ |
| Flow Rate (liters/hr) | 0.50 | 2.00 | 2.00 |
| Breakthrough Capacity Charcoal (liters) | 14 | 25 | 108* |
| Original Transmission at 550 m$\mu$ (%) | 2.5 | 2.5 | 2.5 |
| Effluent Transmission at 550 m$\mu$ (%) after: | | | |
| 13 liters | 95 | | |
| 16 liters | 65 | | |
| 24 liters | | 91 | |
| 27 liters | | 82 | |
| 108 liters | | | 96.5 |

*Experiment terminated at 108 liters.

The results show that the capacity of the charcoal was increased from 14 liters to 25 liters when placed in a radiation source and to over 108 liters when, in addition, the solution was under an oxygen pressure of 1500 psi. Note that the transmission of the aqueous effluent after passage through the charcoal was 96.5% after more than 108 liters of dye solution had passed through the charcoal column. In effect, the data show a process for continuously sorbing the organic content of the feed on the carbon bed to effect decolorization and effecting simultaneous regeneration of the spent carbon. There is in fact a clear indication that the capacity of the bed is actually enhanced with increasing dosage and oxygen content in the feed.

The significance of this invention as a method of pollution control can be appreciated when it is considered that prior to this invention it had been known that aqueous-based dye effluents can be decolorized by prolonged exposure to radiation. Since over 99% of the weight of most aqueous effluents is water, it is clear that it is desirable to reduce the radiation to the aqueous phase and concentrate the radiation dose to the organic dye fraction. By placing charcoal in an irradiation vessel, the charcoal sorbable fraction can be removed from the effluent stream and concentrated on the charcoal. Thus it is possible to maximize irradiation of the organic material and minimize irradiation of water. By adjusting effluent flow through a column of porous charcoal bed for maximum sorption, the radiation dose can be adjusted to provide for constant in situ regeneration of the charcoal aided by an oxygen pressure in the range 50 to 2000 psi to aid in the oxidation of sorbed organics to achieve a constant reactivation of sorbent while continuously producing a decolorized aqueous product.

While we have exemplified the practice of this invention in terms of treating organic dye solutions, it will be apparent and within the scope of this invention to treat such organic containing liquid or gaseous effluents as issuing from such sources as paper and textile wool mill effluents and food processing effluents to produce a product which can be acceptably discharged to atmosphere or public streams.

What is claimed is:

1. A method for treating chromophoric organic waste material dissolved or dispersed in an aqueous effluent which comprises pressurizing the effluent with oxygen at a pressure in the range 50–2000 psi, contacting the pressurized effluent with an inert particulate carbonaceous sorbent selected from the group consisting of finely divided wood product activated charcoal, bone activated charcoal, and coal and coke derived activated carbon, irradiating the resultant mixture with high energy radiation until a decolorized liquid is produced, and then separating the decolorized liquid.

2. The method according to claim 1 wherein the radiation is gamma radiation.

3. A method of treating chromophoric organic waste effluent dissolved or dispersed in an aqueous phase which comprises pressurizing said aqueous phase with oxygen, passing the pressurized aqueous phase through a porous column of an inert particulate carbonaceous sorbent selected from the group consisting of finely divided wood product activated charcoal, bone activated charcoal, and coal and coke derived activated carbon while irradiating said column with high energy radiation to produce a decolorized aqueous product issuing from said column.

* * * * *